United States Patent [19]

Hanson

[11] 4,324,539

[45] Apr. 13, 1982

[54] CONCRETE PRESSURE MONITORING DEVICE FOR MONOLITHIC CONCRETE STRUCTURE FORMING APPARATUS

[75] Inventor: Richard W. Hanson, Spokane, Wash.

[73] Assignee: R. A. Hanson Co., Inc., Spokane, Wash.

[21] Appl. No.: 35,554

[22] Filed: May 3, 1979

[51] Int. Cl.[3] .......... B28C 7/16

[52] U.S. Cl. .......... 425/59; 425/63; 425/140; 425/149; 425/170

[58] Field of Search .......... 264/40.7; 425/59, 63, 425/140, 141, 148, 149, 170

[56] References Cited

U.S. PATENT DOCUMENTS

| | | | |
|---|---|---|---|
| 2,969,576 | 1/1961 | Fuller | 425/59 |
| 3,032,852 | 5/1962 | Hanson | 425/59 |
| 3,049,783 | 8/1962 | Hanson | 425/59 |
| 3,083,433 | 4/1963 | Tiller | 425/140 |
| 3,475,800 | 11/1969 | Jones | 425/63 |
| 3,792,942 | 2/1974 | Cole | 425/63 |
| 4,131,596 | 12/1978 | Allen | 425/149 |

*Primary Examiner*—John A. Parrish
*Attorney, Agent, or Firm*—Wells, St. John & Roberts

[57] ABSTRACT

A concrete pressure monitoring device in an apparatus for continuously forming an elongated monolithic concrete structure within a prepared excavation. The device includes a pressure sensitive membrane exposed to wet concrete between a bottom surface of the excavation and an inner form member of the apparatus. The membrane covers an open end of a fluid filled housing so that variations in concrete pressure adjacent the membrane will flex the membrane to cause displacement of fluid within the housing. A remote indicator responsive to displacement of fluid within the housing is operatively connected to the housing to indicate the concrete pressure variations.

12 Claims, 3 Drawing Figures

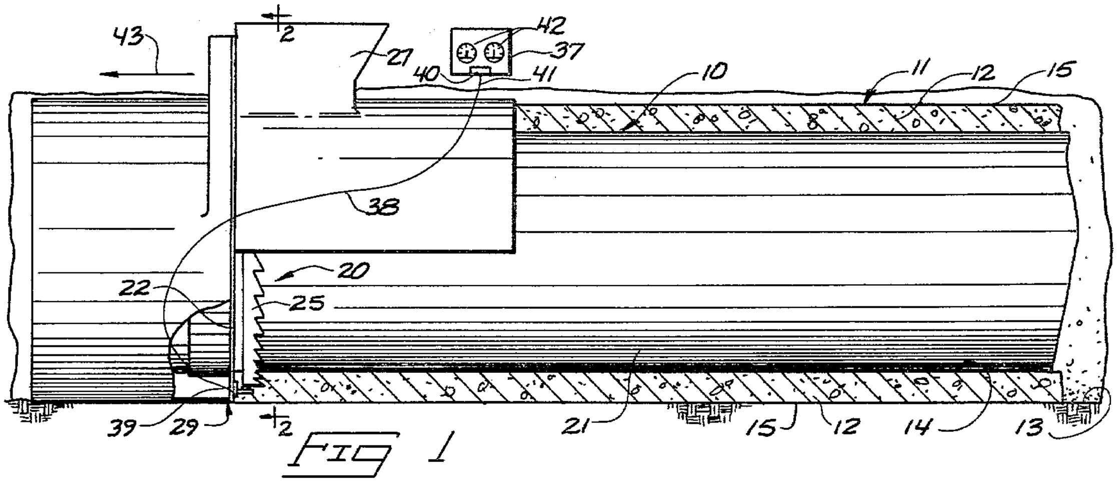
FIG 1
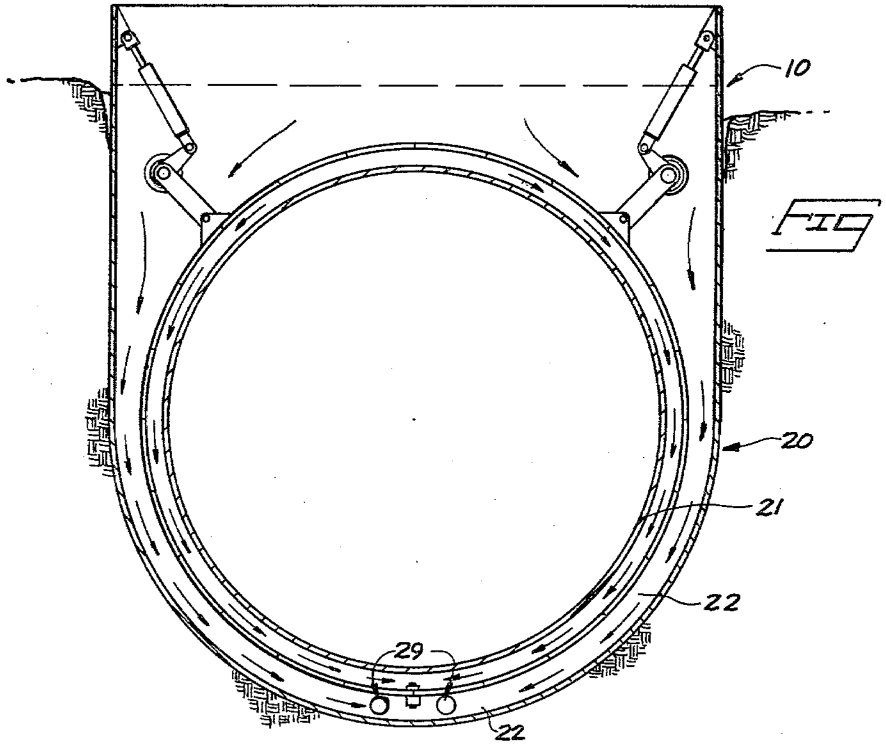
FIG 2
FIG 3
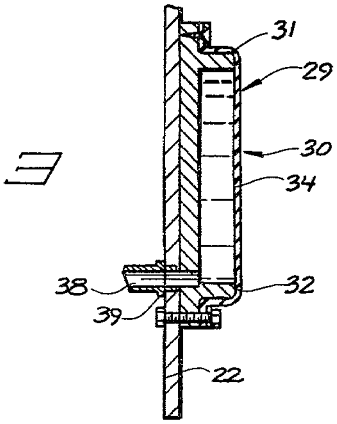

CONCRETE PRESSURE MONITORING DEVICE FOR MONOLITHIC CONCRETE STRUCTURE FORMING APPARATUS

BACKGROUND OF THE INVENTION

The present invention is related to apparatus for forming monolithic concrete structures in excavations, particularly full circle cast-in-place pipe or linings.

Elongated monolithic concrete structure forming machines typically embody an inner form that is utilized to progressively form an inner or core surface of the monolithic structure. Concrete is delivered between the excavation walls and the inner form member through a distributor assembly that may be forwardly movable along the length of the inner form. The distributor assembly may be moved forwardly in response to delivery of concrete between the inner form and the excavation walls. It may move forwardly and continuously along the full length of the excavation with the inner form either extending the full length of the excavation or being taken up in sections and placed ahead of the distributor assembly as it progresses forwardly. The distributor assembly typically includes an upwardly facing hopper for receiving concrete. It may also include an oscillating consolidator directly adjacent to the hopper and extending about the inner form structure to increase the fluid flow of concrete about the inner form structure. Various shapes of the finished concrete monolithic structure may be produced by using the distributor assembly and various shapes of inner forms. It is typical to utilize a cylindrical inner form member for formation of continuous concrete pipe.

A serious problem exists in delivering adequate supplies of concrete to the bottom side of the continuous structure, especially during formation of large continuous concrete pipe, culverts or tunnels. Concrete is typically delivered to the hopper at the top of the forming apparatus and must flow downwardly and around an inner form to fill the area between the form and the side walls of the excavation. Even where consolidator mechanisms are utilized to facilitate concrete flow there can be no real assurance that flow of the wet concrete material will completely fill the void between the excavation walls and the inner form at the bottom of the excavation. Insufficient concrete delivery to the area will create holes or depressions within the structure. Excessive flow of concrete to the bottom will cause the apparatus to "float" the inner form, and create excessive wall thickness at the bottom of the structure and misalign the longitudinal axis for the formed structure.

The present invention was conceived to provide an indication as to whether concrete is being received in adequate supplies to the bottom of the excavation, and whether the pressure of the concrete at the bottom is so great as to "float" the inner form.

BRIEF DESCRIPTION OF THE DRAWINGS

FIG. 1 is a longitudinal partially sectioned view illustrating the present invention with portions thereof being indicated diagrammatically;

FIG. 2 is a transverse cross section taken along line 2—2 in FIG. 1; and

FIG. 3 is an enlarged sectional view of the pressure sensing means of the present invention.

DETAILED DESCRIPTION OF A PREFERRED EMBODIMENT

FIG. 1 of the drawings shows an apparatus 10 for forming an elongated monolithic structure 11 from concrete 12. The structure is formed by placement of concrete along the surface of an excavation 13. The excavation is formed to include upright side walls that converge downwardly to a bottom wall. They may be angular or arcuate depending on the specific requirements for the structure and the particular design of the apparatus 10. The concrete structure 11 may also vary in cross-sectional configuration depending on the shape of the excavation and the shape of the forming members within the apparatus. For example, the apparatus is preferably used to form a tubular, full circle structure as shown in FIG. 1 with an inner bore 14 and an outer shell 15. The shell 15, of course, conforms to the walls of the excavation.

The present apparatus 10 includes a concrete distributor assembly 20 that moves longitudinally within the excavation and supports an inner form member 21. The inner form member 21 is utilized to shape the concrete received by the distributor assembly 20 and to define the inner floor or bottom surface of the structure. The distributor assembly 20 receives concrete and delivers it to the area between the inner form member 21 and excavation walls while moving in a forward direction (see arrow 43 in FIG. 1). The distributor assembly 20 may move lengthwise along a stationary inner form member 21 as shown, or it may be attached to the form member and pulled along as a slipform.

Generally, the distributor assembly 20 includes an upright bulkhead 22 at a forward end thereof. The bulkhead 22 is situated forward of a consolidator 25. The consolidator 25 is situated below a hopper 27 that will receive wet concrete and direct it about the inner form member and against the excavation walls rearward of bulkhead 22. The consolidator 25 engages and agitates the wet concrete, encouraging its flow downward to the excavation bottom.

Other more specific details of the distributor assembly and the inner form member will not be discussed in substantial detail within this application. Such details may be found within U.S. Pat. No. 3,032,852 and U.S. Pat. No. 3,049,783 granted May 12, 1962 and Aug. 12, 1962 respectively to Raymond A. Hanson and are hereby incorporated by reference into the present application.

The pressure monitoring device of the present invention is generally illustrated at 29. The monitoring device is connected to the distributor assembly 20 for the purpose of sensing concrete pressure at the excavation bottom and indicating the pressure at a remote location.

The pressure monitoring device includes a pressure sensing means 30 and a remote indicator means 37. Both the sensing means 30 and indicator means 37 may be electronically, mechanically or hydraulically operated to sense and indicate concrete pressure at the excavation bottom. The hydraulic sensing arrangement shown and described below merely exemplify a preferred form thereof.

The pressure sensing means 30 preferably includes at least one hollow fluid-filled housing 31 mounted to the bulkhead 22 with an open end 32 facing rearwardly. The location of each sensing means 30 on bulkhead 22 is between the excavation bottom wall and the upwardly adjacent bottom surface of the inner form member.

The open end 32 of each hollow fluid filled housing 31 is covered by a pressure sensitive membrane 34. The membrane 34 is exposed to the concrete between the inner form member 21 and the excavation bottom wall. It will be moved in response to pressure variations of the adjacent concrete. Such movement will displace fluid within the housing by changing the volume capacity of the housing. Therefore, if the concrete at the bottom of the excavation is pressurized, the pressure sensitive membrane 31 will flex inwardly, decreasing the volume within the housing 31 and displacing fluid. Conversely, if a low pressure area occurs between the inner form member and excavation bottom, the pressure sensitive membrane will flex slightly outwardly, thereby increasing the volume within the housing and drawing fluid into the housing.

It is preferred that the pressure sensitive membranes 34 be formed of a sheet of neoprene. Such material will wear effectively against wet concrete and will respond quickly and accurately in response to pressure variations within the adjacent concrete.

The remote indicator means 37 is operatively connected to the pressure sensitive membranes in order to indicate displacement of fluid within the housing as pressure variations in the adjacent concrete. The remote indicator means 37 may include an elongated tube 38 in open communication at one end 39 with each fluid filled housing 31. Each tube may include a remote end 41 connected to appropriate means 40 for measuring fluid pressure. Means 40 will include at least one meter 42 for indicating to an operator the concrete pressure immediately behind the associated membrane 34.

In operation, concrete is delivered to the hopper 27 at a prescribed rate. The concrete will flow from the hopper through the distributor 20 downwardly around the inner form member 21 and against the walls of the excavation. The consolidator 25 may assist the downward movement of the concrete by vibrating or oscillating in position between the walls of the excavation and inner form member. As concrete is delivered through the distributor assembly, forward movement is simultaneously initiated either by pulling the distributor assembly along within the excavation or by powering the distributor assembly as suggested in the above incorporated patents.

Excessive concrete pressure build up along the bottom of the excavation will be immediately indicated to the operator. The pressure change is sensed as the membranes 34 flex inwardly to positively displace fluid, sending it through the tubes 38 in a flow direction indicating positive pressure through the remote indicator 40. The operator is thereby made aware of the increased pressure and can appropriately control the distributor mechanism to increase its forward progress and thereby decrease the pressure. Alternatively, he may decrease the operating speed of the consolidator so that less concrete will be delivered to the bottom of the excavation. He could also reduce the head of concrete in the distributor hopper.

When concrete is not being received at the bottom of the excavation, a void forms and the membrane will flex outwardly causing an opposite flow of fluid in the housing and tube. This flow will be measured by the indicator to tell the operator that little or no concrete is being delivered to the excavation bottom. He may therefore correct the problem by slowing or temporarily halting forward progress of the distributor head, increasing the operational rate of the consolidator, or increasing the head or feed rate of concrete at the hopper.

Automatic controls (not shown) can conceivably be connected to the indicator 40 for activating control mechanisms which could respond to increased or decreased concrete pressure at the excavation bottom and appropriately correct the problem by increasing or decreasing the concrete feed rate, forward progress of the distributor assembly or speed of the consolidator mechanisms.

The concrete pressure monitoring device enables the user of the forming equipment to produce a monolithic concrete structure having a uniform cross section, especially along the bottom surface thereof.

The above description and drawings are given by way of example to set forth a preferred form of the present invention. The following claims are intended to set forth the scope of the invention.

What I claim is:

1. In an apparatus for continuously forming an elongated monolithic concrete structure along a prepared soil surface within an excavation formed with walls converging downwardly and transversely to a bottom surface and with the apparatus having a distributor assembly including a forward upright bulkhead conforming to the transverse configuration of the excavation adapted to move longitudinally along the prepared soil surface, and an inner form member supported by the distributor at an elevation spaced from the excavation walls to transversely shape concrete fed into the distributor rearward of the bulkhead during longitudinal movement thereof; a pressure monitoring device, comprising:

pressure sensing means mounted to the distributor rearward of the bulkhead adjacent the bottom surface of the excavation for sensing pressure variance within the concrete rearwardly adjacent the bulkhead and between the inner form member and excavation bottom; and remote indicator means communicating with the pressure sensing means and responsive thereto for indicating pressure levels of the concrete adjacent the pressure sensing means.

2. The apparatus of claim 1 wherein the pressure sensing means includes a pressure sensitive membrane on the distributor assembly, exposed to concrete received between the inner form member and bottom surface of the excavation for movement in response to pressure variation within the adjacent concrete.

3. The apparatus of claim 2 wherein the pressure sensing means further comprises a hollow fluid filled housing mounted to the distributor assembly and having one open side thereof covered by the membrane so that movement of the membrane will change the volume within the housing and wherein the remote indicator means is in open communication with the fluid within the housing to indicate the pressure levels in the concrete in response to variation of the fluid volume enclosed within the housing.

4. The apparatus as defined by claim 3 wherein the remote indicator means includes a tube having an end in open communication with the interior of the fluid filled housing to receive fluid therefrom; and a fluid pressure measuring means connected to the remaining end of the tube to indicate fluid pressure changes within the tube and housing caused by variation in concrete pressure adjacent the membrane.

5. The apparatus of claim 3 wherein the pressure sensing means further comprises a hollow fluid filled housing mounted to the distributor assembly and having one open side thereof covered by the membrane so that movement of the membrane will change the volume within the housing and wherein the remote indicator means is in open communication with the fluid within the housing to indicate the pressure levels in the concrete in response to variation of the fluid volume enclosed within the housing.

6. The apparatus as defined by claim 5 wherein the remote indicator means includes a tube having an end in open communication with the interior of the fluid filled housing to receive fluid therefrom; and a fluid pressure measuring means connected to the remaining end of the tube to indicate fluid pressure changes within the tube and housing caused be variation in concrete pressure adjacent the membrane.

7. The apparatus as set out in claim 1 for continuously forming an elongated monolithic tubular concrete structure wherein the apparatus includes an annular distributor assembly with a substantially circular bulkhead and wherein the inner form member is substantially cylindrical, the pressure sensing means further comprising:

a membrane on the bulkhead exposed to concrete received between the cylindrical inner form and the bottom surface of the excavation for movement in response to pressure variation within the adjacent concrete.

8. The apparatus as set out in claim 1 wherein the apparatus includes a consolidator member located between the inner form and excavation walls rearwardly adjacent the bulkhead, the pressure sensing means further comprising:

a flexible membrane on the distributor assembly forward of the consolidator member exposed to concrete received between the inner form member and bottom surface of the excavation for flexure in response to pressure variation within the adjacent concrete.

9. the apparatus as set out by claim 8 wherein the flexible membrane is mounted to a hollow fluid filled housing on the distributor assembly so that flexure of the membrane in response to varying pressure of adjacent concrete will cause change in the volume within the housing; and wherein the remote indicator means is in open communication with the fluid within the housing.

10. The apparatus as defined by claim 9 wherein the remote indicator means includes a tube having an end in open communication with the interior of the fluid filled housing to receive fluid therefrom; and a fluid pressure measuring means connected to the remaining end of the tube to indicate fluid pressure changes within the tube and housing caused by variation in concrete pressure adjacent the membrane.

11. The apparatus as set out by claim 1 wherein the pressure sensing means includes a membrane on the distributor assembly facing rearwardly to be exposed to concrete received between the inner form member and bottom surface of the excavation.

12. The apparatus as set out in claim 11 wherein the membrane is formed of a sheet of neoprene and wherein the pressure sensing means further includes a fluid filled hollow housing on the distribution assembly mounting the membrane across an open end thereof so that movement of the membrane in response to concrete pressure changes will cause displacement of fluid within the housing; and wherein the remote indicator means is operatively connected to the housing and is operative in response to displacement of fluid within the housing.

* * * * *